United States Patent
Usoro et al.

(10) Patent No.: US 7,972,235 B2
(45) Date of Patent: Jul. 5, 2011

(54) HYBRID POWERTRAIN SYSTEM HAVING SELECTIVELY CONNECTABLE ENGINE, MOTOR/GENERATOR, AND TRANSMISSION

(75) Inventors: Patrick B Usoro, Troy, MI (US); Shawn H Swales, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 919 days.

(21) Appl. No.: 11/870,440

(22) Filed: Oct. 11, 2007

(65) Prior Publication Data

US 2009/0098976 A1    Apr. 16, 2009

(51) Int. Cl.
    *F16H 3/72* (2006.01)
(52) U.S. Cl. ............................. 475/5; 903/912
(58) Field of Classification Search .......... 903/912; 74/665 C; 475/5; 477/5
    See application file for complete search history.

(56) References Cited

U.S. PATENT DOCUMENTS

| 3,245,502 | A * | 4/1966 | Randol ............. | 477/89 |
| 2006/0006734 | A1* | 1/2006 | Tabata et al. ....... | 303/3 |
| 2006/0201277 | A1* | 9/2006 | Reisch et al. ....... | 74/607 |
| 2006/0276289 | A1* | 12/2006 | Hirata et al. ....... | 475/5 |
| 2008/0121447 | A1* | 5/2008 | Lang et al. ......... | 180/65.2 |
| 2008/0242498 | A1* | 10/2008 | Miller et al. ....... | 477/5 |

FOREIGN PATENT DOCUMENTS

WO    WO 2006119919 A1 * 11/2006

* cited by examiner

*Primary Examiner* — David D Le
*Assistant Examiner* — Erin D Bishop
(74) *Attorney, Agent, or Firm* — Quinn Law Group, PLLC

(57) ABSTRACT

A hybrid powertrain having an engine, multi-speed transmission connected to a final drive and not continuously connected to the engine, a single motor/generator connected to an energy storage device and a controller and not continuously connected to the engine or transmission, and three clutches. The first clutch is connected to the engine, the second clutch is connected to the transmission and first clutch, and the third clutch is connected to the motor/generator and first and second clutches. The first and second clutches are operable for selectively interconnecting the engine and transmission; the first and third clutches are operable for selectively interconnecting the engine and motor/generator; the second and third clutches are operable for selectively interconnecting the transmission and motor/generator; and the three clutches are operable for selectively interconnecting the engine, transmission and motor/generator to transmit power therebetween. An engine starter system may be connected to the engine to transmit power to and receive power from the engine.

19 Claims, 2 Drawing Sheets

HYBRID POWERTRAIN SYSTEM HAVING SELECTIVELY CONNECTABLE ENGINE, MOTOR/GENERATOR, AND TRANSMISSION

TECHNICAL FIELD

The present invention relates generally to motor vehicle powertrains, and more particularly to hybrid powertrains having a plurality of torque transmitting devices in combination with an engine, a multi-speed transmission, and a single motor/generator.

BACKGROUND OF THE INVENTION

Conventional automotive vehicles include a powertrain (sometimes referred to as a drivetrain) that is generally comprised of an engine, multi-speed transmission, and a final drive (e.g., driveshaft, differential, and wheels). Hybrid type powertrains generally employ an internal combustion engine (ICE) and one or more motor/generator units that operate either individually or in concert to propel the vehicle—e.g., power output from the engine and motor/generators are transferred through planetary gearing in the multi-speed transmission to be transmitted to the vehicle's final drive. The electric-only drive capability of the vehicle is optimal where noise and/or exhaust emissions are of prime concern, whereas the engine-only drive capability is optimal where power output requirements exceed that of the motor/generator assembly.

Vehicles employing a hybrid powertrain (identified collectively as hybrid vehicles) are well suited for urban transportation where a significant amount of stop-and-go driving is undertaken. During urban travel, the hybrid powertrain takes advantage of both the ICE and motor/generator to improve upon fuel economy and exhaust emissions. For example, many hybrid powertrains permit the engine to be shut-off completely at vehicle stops to reduce fuel consumption. Additionally, the electric drive in some hybrid powertrains can be used for engine restart and/or vehicle acceleration. Moreover, some hybrid vehicles use electrical regenerative braking to recharge an internal electrical power storage device (i.e., batteries or similar component).

During regenerative braking, an onboard controller, such as a central processing unit (CPU) or electronic control unit (ECU), monitors the hybrid powertrain. When the vehicle is coasting downhill and/or the vehicle brakes are being applied, the controller reverses the polarity of the motor/generators, which resists rotation of the wheels, thereby providing a braking force. Effectively, the forward momentum of the vehicle (kinetic energy) is converted into electrical energy (e.g., through electromagnetic induction), which is then transferred to a battery pack for storage. The electrical energy produced by regenerative braking can thereafter be used to propel the vehicle or power vehicle accessories, providing even further improvements in fuel economy.

Hybrid powertrains are also well suited for over-the-road transportation, such as highway driving, where the electric motor/generator units can be utilized to assist in driving the vehicle during high-power output conditions such as rapid acceleration and hill climbing. The electric motor/generator units are also capable of providing propulsion in the event that engine operation is discontinued.

While hybrid vehicles offer the potential for significant fuel economy improvements over their conventional counterparts, their market penetration has been limited due to their relatively high cost/benefit ratio. It becomes pertinent to develop hybrid technologies that reduce cost and improve vehicle fuel economy. Two major contributors to the cost of hybrid vehicles are the capacity and complexity of certain hybrid powertrain componentry, and the size and number of motor/generators required to realize certain system requirements.

SUMMARY OF THE INVENTION

Provided herein is a family of hybrid powertrain systems having a selectively connectable engine, motor/generator, and transmission. The hybrid powertrains described hereinbelow provide improved fuel economy due to reduced parasitic power losses, reduced engine-start-shock, and increased flexibility in the uses of engine drive and electric drive, both independently and collaboratively. In addition, the hybrid powertrains described herein also provide for improved cost/benefit ratios by utilizing a single traction motor/generator, having the ability to employ existing, conventional multi-speed transmissions, and allowing for the potential elimination of some electrically driven vehicle accessories.

The family of hybrid powertrain systems include an engine, a multi-speed transmission operatively connected to a final drive and not continuously connected to the engine, a motor/generator operatively connected to a first energy storage device and a first controller and not continuously connected to the engine or transmission, and at least three torque transmitting devices configured to be engaged in various combinations, ideally two or three, for selectively interconnecting the engine, motor/generator, and transmission. The first of the three torque transmitting devices is operatively connected to the engine, whereas the second torque transmitting device is operatively connected to the transmission, and the third torque transmitting device is operatively connected to the motor/generator. The three torque transmitting devices are operatively connected to each other.

The first and second torque transmitting devices are operable for selectively interconnecting the engine and transmission to enable power transfer therebetween. Similarly, the first and third torque transmitting devices are operable for selectively interconnecting the engine and motor/generator to enable power transfer therebetween. Finally, the second and third torque transmitting devices are operable for selectively interconnecting the transmission and motor/generator to transmit power therebetween. Engagement of all three torque transmitting devices permits power transfer between the engine, motor/generator, and transmission.

According to a preferred embodiment of the present invention, the hybrid powertrains described herein have only one motor/generator. In addition, it is further preferred that the first, second, and third torque transmitting devices are each a selectively engageable clutch. Selectively engageable clutches may be actuated hydraulically or electromagnetically, and may be of the friction type, fluid type (such as a fluid coupling or torque converter), magnetorheological or electrorheological fluid type, and the like.

It is further desired, as part of a preferred embodiment of the present invention, that the first energy storage device be configured to transmit power to and receive power from the motor/generator. Ideally, the controller is configured to regulate the desired mode and output of the motor/generator.

According to a first alternate embodiment of the present invention, the hybrid powertrain also includes a transmission pump that is operatively connected to the third clutch and not continuously connected to either the engine or transmission. In this instance, the third clutch is preferably a spring-applied, hydraulically-disengaged clutch configured to permit the motor/generator to power the transmission pump during engine-off conditions and engine start-up. The transmission pump is operatively connected to the first, second, and third clutches, and configured to be selectively powered by the engine, motor/generator, and/or transmission. As a further alternative, the third clutch may be applied by other methods, such as electro-magnetically or electro-mechanically. It is also preferred that the hybrid powertrain of the first alternate embodiment includes one or more vehicle accessories operatively connected to the first, second, and third torque transmitting devices to permit the accessories to be driven by the engine, the motor/generator, or both.

According to a second alternate embodiment of the present invention, the hybrid powertrain also includes an engine starter system operatively connected to the engine and configured to transmit power to and receive power therefrom. Ideally, the engine starter system includes an alternator/starter, a second energy storage device, and a second controller operatively connecting said alternator/starter with said second energy storage device. The second controller is configured to control the desired mode and output of the alternator/starter. It is preferred that the hybrid powertrain of the second alternate embodiment also include one or more vehicle accessories operatively connected to the engine and engine starter system to permit the accessories to be driven by the engine, the engine starter system, or both.

The above features and advantages, and other features and advantages of the present invention will be readily apparent from the following detailed description of the preferred embodiments and best modes for carrying out the invention when taken in connection with the accompanying drawings.

DESCRIPTION OF THE PREFERRED EMBODIMENTS

Figure 1:
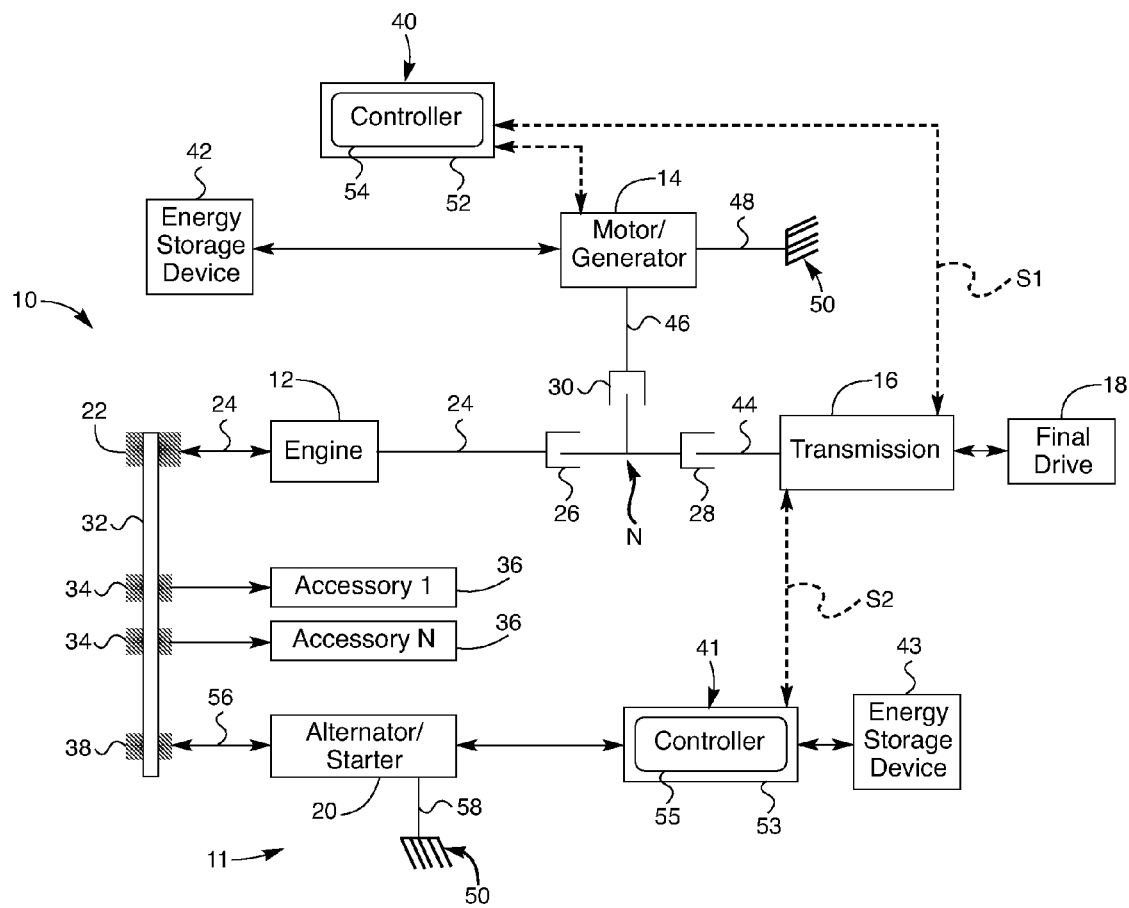
FIG. 1 is a schematic illustration depicting a hybrid powertrain having three torque transmitting mechanisms in combination with an engine, a single motor/generator, a transmission, and an optional engine starter system in accordance with a first embodiment of the present invention.

Referring to the drawings, wherein like reference numbers refer to the same or similar components throughout the several views, FIG. 1 is a schematic representation of a hybrid powertrain, shown generally as 10, in accordance with the present invention. The powertrain 10 of FIG. 1 includes a restartable engine 12, a motor/generator unit 14, a multi-speed transmission 16 connected to a hybrid vehicle final drive 18, and an optional engine starter system, identified generally as 11. In the embodiment depicted, the engine 12 may be any engine, such as a 2-stroke diesel engine or a 4-stroke gasoline engine, which is readily adapted to provide its available power output typically delivered at a number of revolutions per minute (RPM).

The engine 12 is configured to transmit power, preferably by way of torque, to a crank pulley 22 via an engine output shaft, such as crankshaft 24. Recognizably, the output shaft operatively connecting the engine to the crank pulley 22 need not necessarily be the crankshaft 24, but may be a separate transfer shaft (not shown) configured to transmit power from the engine 12 to the crank pulley 22. A belt 32 couples the crank pulley 22 with one or more accessory pulleys 34, whereas the accessory pulleys 34 are each operatively connected to a respective one of a plurality of vehicle accessories 36. In other words, power from the engine 12 is transferred from the crankshaft 24 through the crank pulley 22 and accessory pulleys 34 via belt 32 to drive the various vehicle accessories 36. The types of vehicle accessories that may be driven by the engine 12 include, by way of example only, compressors, such as pneumatic brake compressors or heating, ventilation, and air conditioning (HVAC) compressors, hydraulic pumps, such as those used for power steering, water pumps, and vacuum pumps. Notably, the various input and output pulleys and corresponding belts described herein can be replaced by connecting shafts, chain and sprocket assemblies, or intermeshing gears without departing from the scope of the present invention.

Still referring to FIG. 1, the motor/generator 14 includes a motor/generator output member, such as rotor 46, and a stator 48. The stator 48 of the motor/generator 14 is secured (or "grounded") to a stationary member 50, such as the transmission case, the chassis frame, or the vehicle body. The motor/generator 14 is preferably configured to selectively operate as a motor or a generator—capable of converting electrical energy to mechanical energy, and converting mechanical energy to electrical energy. For instance, the motor/generator 14 is configured to receive power from and/or transfer power to a first energy storage device 42, such as a battery, a fuel cell, capacitor, fly wheel, and the like. In this regard, the motor/generator 14 is preferably configured to generate electricity during regenerative braking for storage in the first energy storage device 42. Furthermore, the motor/generator 14 is configured to transfer power to and receive power from the transmission 16 and the engine 12, as will be discussed in further detail hereinbelow. The motor/generator 14 is also configured to transmit power to the transmission 16 when the engine 12 is not providing power (in an off-state). Additionally, the motor/generator 14 can be turned off to reduce rotational resistance, and resultant parasitic losses, for improved fuel economy.

The motor/generator 14 is operatively connected to a first controller 40 (e.g., via electric cables, fiber optic cables, radio frequency or other wireless technology, etc.) for controlling operation of the motor/generator 14. The first controller 40, depicted in FIG. 1 in an exemplary embodiment as a microprocessor based electronic control unit (ECU), includes a programmable digital computer 52, having programmable memory 54, configured to receive information and distribute control signals in order to provide the desired mode and output of the motor/generator 14, engine 12, transmission 16, and first, second, and third clutches 26, 28, and 30. By way of example, the first controller 40 controls the operation of the motor/generator 14 to generate electrical energy for storage in the first electrical storage device 42, or to deliver power to the final drive 18 (via transmission 16). The motor/generator 14 may also be controlled to add to the output power of the engine 12. The motor/generator 14 may additionally be controlled to start the engine 12 or rotate the engine crankshaft 24 to run the accessories 36 when the engine 12 is in off state. It is also preferred that the first controller 40 collects data, such as transmission speed, torque, temperature, etc. and distributes control signals, the data and signals identified collectively as signals S1, to provide, for example, the desired shift pattern and clutch operation of the transmission 16.

The transmission 16 is configured to manipulate and distribute power from the engine 12 and/or the motor/generator 14 to the final drive 18, thereby configured to propel the hybrid vehicle (not shown) equipped with the powertrain 10. The transmission 16 is also configured to manipulate and transfer power from the final drive 18 to the motor/generator 14 for regenerative braking. The multi-speed transmission 16 may be a conventional manual or automatic transmission, a step-gear or continuously variable transmission, a dual-clutch or electrically variable transmission, etc. Although not depicted in FIG. 1, it should be appreciated that the final drive 18 may comprise any known configuration, e.g., front wheel drive (FWD), rear wheel drive (RWD), four-wheel drive (4WD), or all wheel drive (AWD). A transient torque damper (not shown) may also be implemented between the engine 12 and the transmission 16.

According to FIG. 1, the engine 12 is also preferably operatively connected to the optional engine starter system 11, defined herein in an exemplary embodiment by an alternator/starter 20, second controller 41, and second energy storage device 43. The second controller 41 and second energy storage device 43 function synonymously with the first controller 40 and first energy storage device 42 of FIG. 1, respectively, unless noted otherwise. As will be described in further detail hereinbelow, the alternator/starter 20 is configured to operate as a starter during startup of the engine 12 and as an alternator to recharge the second energy storage device 43. It is also preferable that the alternator/starter 20 be configured to drive the accessories 36 when the engine 12 is in an off-state, such as when the final drive 18 is being powered exclusively by an alternate power source (e.g., motor/generator 14) in order to conserve fuel, so that the accessories 36 remain fully operational. Synonymous to the motor/generator 14, the alternator/starter 20 is also preferably configured to add to the output power of the engine 12. Although not shown in FIG. 1, the optional starter system 11 may alternatively be a conventional starter, belt-starter, or the like.

As depicted in FIG. 1, the alternator/starter 20 has a rotor 56 rotatably coupled to a starter pulley 38, and a stator 58 fixedly attached to the stationary member 50. The alternator/starter 20 is also operatively connected to the second controller 41, depicted in FIG. 1 in an exemplary embodiment as a micro-processor based electronic control unit (ECU), which includes a programmable digital computer 53 having programmable memory 55 (synonymous to the first controller 40) that distributes control signals to provide the desired mode and output of the alternator/starter 20. By way of example, the second controller 41 controls the operation of the alternator/starter 20 to receive power from the engine 12 and thereby generate electrical energy for storage in the second electrical storage device 43, to deliver power to the engine 12, and/or to deliver power to the accessories 36. Similar to the first controller 40, the second controller 41 can be configured to collect data, such as transmission speed, torque and temperature, etc. and distributes control signals, the data and signals identified collectively as signals S2, to provide the desired shift pattern and clutch operation of the transmission 12.

Advantageously, the alternator/starter 20 is configured to re-start the engine 12 and power the accessories 36 when the engine 12 is being re-started such that there is no interruption in operation of the accessories 36. More precisely, the rotor 56 of the alternator/starter 20 is coupled to the crankshaft 24 of the engine 12 via the starter pulley 38, belt 32, and crank pulley 22. By controlling the alternator/starter 20, output therefrom is transferable to the accessories 36 such that the accessories 36 remain powered, and to the engine 12 such that the engine 12 is driven. As the engine 12 is being driven by the alternator/starter 20, the second controller 41 can introduce an engine spark (not shown) to re-start or crank the engine 12.

Recognizably, the positioning of the optional engine starter system 11 depicted in FIG. 1 is intended to be representative of the preferred embodiment, but is not intended to be limiting. Accordingly, the optional engine starter system 11 can be repositioned at other positions without departing from the scope of the present invention. It should be similarly recognized that the first and second controllers 40, 41 and first and second energy storage devices 42, 43, can be replaced with a single controller (not shown) and a single energy storage device (not shown). Finally, one or more power inverters (not shown) may be provided separate from the first and second controllers, 40, 41 that are configured to convert direct current (DC) power to alternating current (AC) power in the motoring mode (engine-drive only mode), and AC power to DC power in power generation mode (regenerative braking or energy storage/system charging mode).

The powertrain 10 also includes a plurality of torque-transmitting mechanisms, preferably in the nature of rotating-type torque-transmitting mechanisms, defined herein by first, second, and third clutches 26, 28, 30, respectively. The crankshaft 24 of the engine 12 is operatively connected to the first clutch 26. The first clutch 26 is in turn operatively connected to the second and third clutches 28, 30, to thereby define a common node, identified generally as N in FIG. 1. The second clutch 28 is operatively connected to a transmission input shaft 44, whereas the third clutch 30 is operatively connected to the rotor 46 of the motor/generator 14.

According to the preferred embodiment illustrated in FIG. 1 of the drawings, the engine 12 is not continuously connected to the motor/generator 14 or the transmission 16. Similarly, the motor/generator 14 is not continuously connected to the transmission 16. Rather, the engine 12 is selectively connectable with the transmission 16 (and, thus, the final drive 18) via first and second clutches 26, 28. Similarly, the engine 12 is selectively connectable with the motor/generator 14 via the first and third clutches 26, 30. Finally, the motor/generator 14 is selectively connectable with the transmission 16 (and, thus, the final drive 18) via second and third clutches 28, 30. The clutch operation (i.e., engagement and disengagement) of the first, second, and third clutches 26, 28, 30 provides for the various driving modes of the hybrid vehicle.

For engine-only driving, the first and second clutches 26, 28 are engaged, and the third clutch 30 is disengaged. The engine-only engagement schedule enables the engine 12 to transmit power to the final drive 18 via the transmission 16 (to propel the vehicle) without power input from the motor/generator 14. Advantageously, by disengaging the third clutch 30, parasitic losses during engine-only driving caused by drag from the motor/generator 14 are effectively eliminated.

For electric-only driving and regenerative braking, the second and third clutches 28, 30 are engaged, and the first clutch 26 is disengaged. The electric-only engagement schedule enables the motor/generator 14 to transmit power to the final drive 18 via the transmission 16 (to propel the hybrid vehicle) without power input from the engine 12 and incurring engine pumping and parasitic losses. The electric-only engagement schedule also enables the motor/generator 14 to recuperate braking power (kinetic energy) via the transmission 16 through regenerative braking. As will be described below, the first clutch 26 may be partially or fully engaged to power the accessories 36 during electric-only driving and regenerative braking.

For combined engine-electric driving and/or regenerative braking, the first, second, and third clutches 26, 28, 30 are all engaged. The combined engine-electric engagement schedule enables both the engine 12 and motor/generator 14 to transmit power to the final drive 18 via the transmission 16 (to propel the hybrid vehicle). Combined engine-electric driving provides for high acceleration performance and improved efficiency through optimization of power input from both the first energy storage device 42 (via motor/generator 14) and the engine 12. It should be appreciated that the engine 12 can transmit power to the motor/generator 14 to charge the first energy storage system 42 during engine-electric driving mode.

For transitioning from electric-only drive to combined engine-electric drive, the engine 12 of FIG. 1 can be started by either the motor/generator 14 (i.e., by controllably engaging the first clutch 26), or by the optional engine starter system 11, as described above. Thereafter, the speed of the engine 12 is increased up to the speed of the transmission input shaft 44, and the first clutch 26 is then engaged. For transitioning from combined engine-electric drive to realize engine-only drive, the powertrain 10 need only controllably disengage the third clutch 30.

For transitioning from engine-only drive to combined engine-electric drive, the speed of the motor/generator 14 is increased to sufficiently coincide with the speed of the engine 12, and the third clutch 30 is engaged. For transitioning from combined engine-electric drive to realize electric-only drive, the powertrain 10 need only controllably disengage the first clutch 26.

In the context of the present description, "clutch engagement" refers to either full or partial clutch engagement. Partial clutch engagement refers to a situation where sufficient pressure is applied to the clutch to permit torque to be transmitted; however, the clutch continues to slip and is not locked into full engagement. In general, partial engagement of a clutch allows the speeds of the rotating elements attached thereto to be gradually synchronized (brought to equal speed) without undesirable torque disturbances, which may occur if the two elements are synchronized abruptly.

Partial clutch engagement may be necessary to achieve certain desired transient dynamic behavior. For instance, during engine-only vehicle launch (accelerating from zero speed), the first or second clutches 26, 28 (or both) may be partially engaged to permit slip between the engine crankshaft 24 and the transmission input shaft 44, while the third clutch 30 is fully disengaged. Partial engagement of the first clutch 26 allows the engine 12 to launch the vehicle smoothly from zero speed, without stalling. Similarly, for combined electric-engine launch, the second and third clutches 28, 30 are fully engaged, and the first clutch 26 is partially engaged to permit slip therebetween. Partial engagement of the first clutch 26 allows the motor/generator 14 to crank the engine 12 from zero speed without transmitting the resulting torque pulses to the driveline. For electric-only launch, the second and third clutches 28, 30 are fully engaged, and the first clutch 26 is completely disengaged. The clutch operation provided herein is controlled to achieve smooth transitions with minimal excitation of the driveline.

The arrangement of the first, second, and third clutches 26, 28, 30 in the powertrain 10 of FIG. 1, the unique combination of the three clutches 26, 28, 30 with a single motor/generator 14, and the schedule of engagement described above provides for improved fuel economy due to reduced parasitic power losses, reduced engine-start-shock, and increased flexibility in the uses of engine-only drive, electric-only drive, and engine-electric drive (providing even further improvement in fuel economy).

Figure 2:
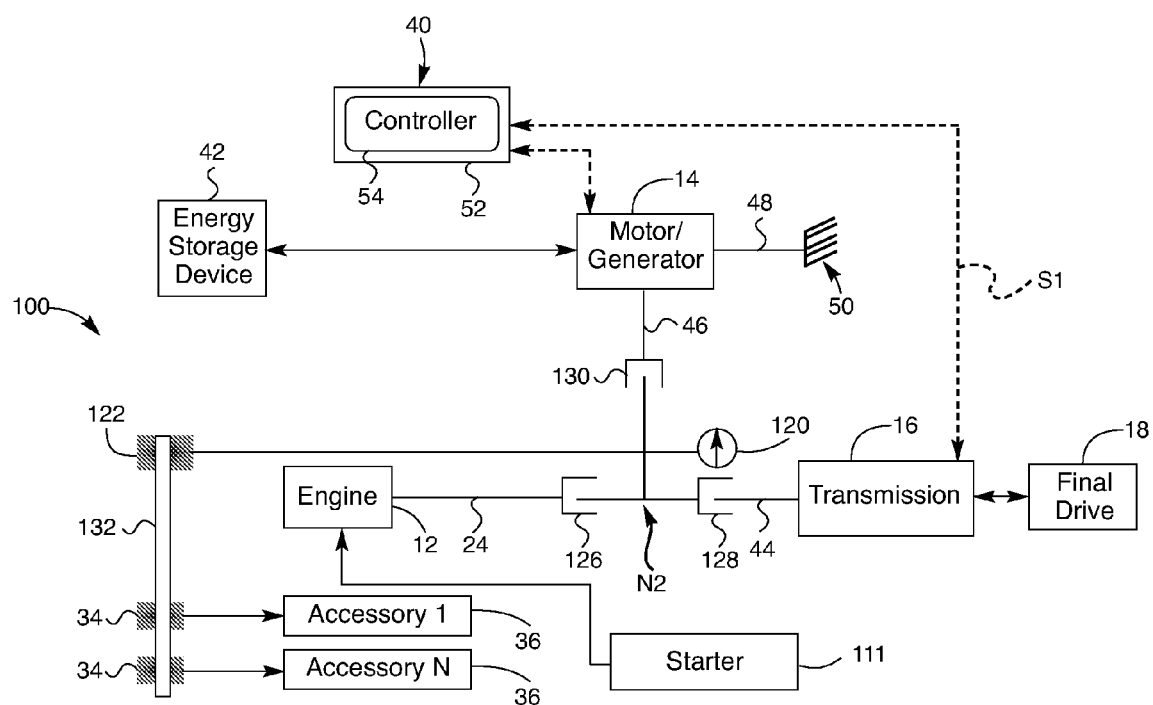
FIG. 2 is a schematic illustration depicting a hybrid powertrain having three torque transmitting mechanisms in combination with an engine, a single motor/generator, a transmission, and an optional engine starter system in accordance with an alternate embodiment of the present invention.

Turning now to FIG. 2, wherein like reference numbers refer to the same or similar components as FIG. 1, a hybrid powertrain, shown generally as 100, is provided in accordance with an alternate embodiment of the present invention. The powertrain 100 of FIG. 2 includes a restartable engine 12, a motor/generator 14, a multi-speed transmission 16 connected to a hybrid vehicle final drive 18, and an optional engine starter system 111. As will be described in further detail below, FIG. 2 illustrates a separate embodiment that functions similar to the previously described hybrid powertrain 10 of FIG. 1, but includes, among other things, variations in the arrangement of the various torque transmitting devices and accessories. Therefore, the components of FIG. 2 should be considered to be identical to a respective component of FIG. 1, identified with a common reference number, unless specified otherwise.

Similar to the powertrain 10 of FIG. 1, the powertrain 100 includes a plurality of torque-transmitting mechanisms, preferably in the nature of rotating-type torque-transmitting mechanisms, defined herein by first, second and third clutches 126, 128, 130, respectively. The first, second and third clutches 126, 128, 130 can be, by way of example, selectively engageable clutches. The crankshaft 24 of the engine 12 is operatively connected to the first clutch 126. The first clutch 126 is in turn operatively connected to the second and third clutches 128, 130, to thereby define a common node, identified generally as N2 in FIG. 2. The second clutch 128 is operatively connected to the transmission input shaft 44, and the third clutch 130 is operatively connected to the rotor 46 of the motor/generator 14.

Still referring to FIG. 2, the engine 12 is not continuously connected to the motor/generator 14 or the transmission 16. Similarly, the motor/generator 14 is not continuously connected to the transmission 16. Rather, the engine 12 is selectively connectable with the transmission 16 (and, thus, the final drive 18) via first and second clutches 126, 128. Similarly, the engine 12 is selectively connectable with the motor/generator 14 via the first and third clutches 126, 130. Finally, the motor/generator 14 is selectively connectable with the transmission 16 (and, thus, the final drive 18) via second and third clutches 128, 130. The clutch operation (i.e., engagement and disengagement) of the first, second, and third clutches 126, 128, 130 of FIG. 2 provides for the various driving modes of the hybrid vehicle (not shown).

In contrast to the embodiment of FIG. 1, the accessories 34 illustrated in FIG. 2 are selectively driven from the node N2 common to all three clutches 126, 128, 130. In other words, power can be transferred to the accessories 36 from the engine 12, the motor-generator 14, the transmission 16, or a combination of the three. The node N2 is operatively connected to a driving pulley 122. A belt 132 couples the driving pulley 122 with one or more accessory pulleys 34, whereas the accessory pulleys 34 are each operatively connected to a respective one of a plurality of vehicle accessories 36. Power from the engine 12 is transferable from the crankshaft 24 to the driving pulley 122 and accessory pulleys 34 via belt 132 to drive the various vehicle accessories 36 when the first clutch 126 is engaged. Likewise, power from the motor/generator 14 is transferable from the rotor 46 to the driving pulley 122 and accessory pulleys 34 via belt 132 to drive the various vehicle accessories 36 when the third clutch 130 is engaged.

For electric-only driving and regenerative braking, the second and third clutches 128, 130 are engaged, and the first clutch 126 is disengaged. The electric-only engagement schedule for FIG. 2 enables the motor-generator 14 to transmit power to both the driving pulley 122 and transmission input shaft 44 and, thus, drive the accessories 36 and final drive 18 (to propel the hybrid vehicle) without input from the engine 12 and without incurring engine pumping and parasitic losses. The electric-only engagement schedule also enables the motor/generator 14 to recuperate braking power via the transmission 16 through regenerative braking. In addition, depending upon the input speed of the transmission 16, the second clutch 128 may be partially engaged to ensure that the accessories 36 are being driven at an adequate speed by the motor/generator 14. In other words, slipping will permit a speed difference across the second clutch 128, allowing power from the motor/generator 14 to be redirected away from the transmission 16 to run the accessories 36 at selectable speeds even when the vehicle is traveling as slow speeds or is at a complete stop. Alternatively, when the vehicle is stationary, the first and second clutches 126, 128 of FIG. 2 can be disengaged while the third clutch 130 is fully engaged to drive the accessories 36 from the motor/generator 14.

For engine-only driving, the first and second clutches 126, 128 are engaged, and the third clutch 130 is disengaged. The engine-only engagement schedule of FIG. 2 enables the engine 12 to transmit power to both the driving pulley 122 and transmission input shaft 44 and, thus, drive the accessories 36 and final drive 18 (to propel the hybrid vehicle) without input from the motor/generator 14. Advantageously, by disengaging the third clutch 130, parasitic losses caused by drag from the motor/generator 14 are effectively eliminated.

For combined engine-electric driving and/or regenerative braking, the first, second, and third clutches 126, 128, 130 are all engaged. The combined engine-electric engagement schedule of FIG. 2 enables both the engine 12 and motor/generator 14 to transmit power to both the accessories (via the driving pulley 122) and the final drive 18 (via the transmission 16). Similar to FIG. 1, combined engine-electric driving in FIG. 2 provides for high acceleration performance and improved efficiency through optimization of power input from both the energy storage device 42 (via motor/generator 14) and the engine 12. For regenerative braking, the second and third clutches 128, 130 are engaged, and the first clutch 126 is disengaged.

For transitioning from electric-only drive to combined engine-electric drive, the engine 12 is started by the motor/generator 14 (by controllably engaging the first clutch 126). Alternatively, the engine 12 may be started by the optional engine starter system 111, operatively connected thereto. Thereafter, the speed of the engine 12 is increased up to the speed of the transmission input shaft 44, and the first clutch 126 is then fully engaged. For transitioning from combined engine-electric drive to realize engine-only drive, the powertrain 100 of FIG. 2 need only controllably disengage the third clutch 130. The optional engine starter system 111 may be a conventional starter, belt-starter, a belt-alternator-starter, or the like.

For transitioning from engine-only drive to combined engine-electric drive, the speed of the motor/generator 14 is increased to sufficiently coincide with the speed of the engine 12, and the third clutch 130 is engaged. For transitioning from combined engine-electric drive to realize electric-only drive, the powertrain 100 of FIG. 2 need only controllably disengage the first clutch 126.

Preferably, the powertrain 100 of FIG. 2 also includes a transmission pump 120 operatively connected to the node N2 common to the first, second, and third clutches 126, 128, 130. In this instance, the third clutch 130 is preferably a spring-applied, hydraulically-disengaged clutch. As a result, the clutch arrangement depicted in FIG. 2 allows the transmission pump 120 to be driven in the absence of hydraulic pressure supplied by the engine 12 or transmission 16. For example, during engine off-state or start-up, the third clutch 130 is spring-biased into engagement, which permits the motor/generator 14 to transmit power to the transmission pump 120. Accordingly, the powertrain 100 eliminates the need for a separate electrically-driven auxiliary transmission pump (not shown), as is commonly used in hybrid powertrains to provide hydraulic pressure when the engine-driven main pump (not shown) is not rotating. Although not shown, the third clutch 130 may be applied by alternative methods, such as electro-magnetically, electro-mechanically, or like means.

While the best modes for carrying out the present invention have been described in detail herein, those familiar with the art to which this invention pertains will recognize various alternative designs and embodiments for practicing the invention within the scope of the appended claims.

The invention claimed is:

1. A powertrain system comprising:
an engine;
a transmission operatively connected to a final drive and not continuously connected with said engine;
a motor/generator characterized by an absence of continuous connectivity with said engine and said transmission;
first, second, and third torque transmitting devices each being operatively connected to a respective one of said engine, motor/generator, and transmission and configured to be engaged in different combinations of at least two to selectively interconnect at least two of said engine, motor/generator, and transmission to transmit power therebetween;
wherein said engine does not receive power from said motor/generator when said motor/generator is powered as a motor and said third torque transmitting device is not engaged; and
wherein said transmission does not receive power from said engine when said second torque transmitting device is not engaged.

2. The powertrain system of claim 1, wherein said first and second torque transmitting devices are operable for selectively interconnecting said engine and said transmission to transmit power therebetween.

3. The powertrain system of claim 2, wherein said first and third torque transmitting devices are operable for selectively interconnecting said engine and said motor/generator to transmit power therebetween.

4. The powertrain system of claim 3, wherein said second and third torque transmitting devices are operable for selectively interconnecting said transmission and said motor/generator to transmit power therebetween.

5. The powertrain system of claim 4, further comprising:
a first energy storage device operatively connected to said motor/generator and configured to transmit power to and receive power from said motor/generator.

6. The powertrain system of claim 5, further comprising:
a first controller operatively connected to said motor/generator, said controller being configured to control desired modes and output of said motor/generator.

7. The powertrain system of claim 6, wherein said first, second, and third torque transmitting devices are each a selectively engageable clutch.

8. The powertrain system of claim 7, wherein said powertrain system is characterized by an absence of more than one motor/generator operable to provide power to said transmission.

9. The powertrain system of claim 8, further comprising:
a transmission pump operatively connected to said third clutch and not continuously connected to said engine or said transmission, wherein said third clutch is operable to permit said motor/generator to power said transmission pump.

10. The powertrain system of claim 9, wherein said third clutch is a spring-applied clutch configured to permit said motor/generator to power said transmission pump during engine off-state and start-up.

11. The powertrain system of claim 8, further comprising:
an engine starter system operatively connected to said engine and configured to transmit power to and receive power from said engine.

12. The powertrain system of claim 11, wherein said engine starter system comprises an alternator/starter, a second energy storage device, and a second controller operatively connecting said alternator/starter with said second energy storage device, said second controller being configured to control the desired mode and output of said alternator/starter.

13. A hybrid powertrain system comprising:
an engine;
a transmission operatively connected to a final drive and not continuously connected with said engine;
a first energy storage device;
a motor/generator operatively connected to said first energy storage device and not continuously connected to said engine or said transmission, said motor/generator configured to transmit power to and receive power from said first energy storage device;
a first torque transmitting device operatively connected to said engine;
a second torque transmitting device operatively connected to said transmission, wherein said first and second torque transmitting devices are operable for selectively interconnecting said engine and said transmission to transmit power therebetween;
a third torque transmitting device operatively connected to said motor/generator, wherein said first and third torque transmitting devices are operable for selectively interconnecting said engine and said motor/generator to transmit power therebetween, wherein said second and third torque transmitting devices are operable for selectively interconnecting said transmission and said motor/generator to transmit power therebetween, and wherein said first, second, and third torque transmitting devices are operable for selectively interconnecting said engine, said transmission and said motor/generator to transmit power therebetween;
a transmission pump operatively connected to said first, second, and third torque transmitting devices and not continuously connected to said engine, said motor/generator, or said transmission, and configured to be selectively powered by at least one of said engine, motor/generator, and transmission;
wherein said third torque transmitting device is a spring-applied clutch configured to permit said motor/generator to power said transmission pump during engine off-state and start-up; and
wherein said hybrid powertrain is characterized by an absence of more than one motor/generator operable to provide power to said transmission.

14. The hybrid powertrain of claim 13, further comprising:
a first controller operatively connected to said motor/generator, said controller being configured to control desired modes and output of said motor/generator.

15. The hybrid powertrain of claim 14, wherein said first, second, and third torque transmitting devices are each a selectively engageable clutch.

16. The hybrid powertrain of claim 15, further comprising:
an engine starter system operatively connected to said engine and configured to transmit power to said engine.

17. The hybrid powertrain of claim 16, further comprising:
an accessory operatively connected to said engine and said engine starter system to permit said accessory to be driven by said engine, said engine starter system, or both.

18. The hybrid powertrain of claim 14, further comprising:
accessory operatively connected to said first, second, and third torque transmitting devices to permit said accessory to be driven by said engine, said motor/generator, or both.

19. A powertrain system for a hybrid vehicle, comprising:
an internal combustion engine;
a multi-speed transmission operatively connected to a final drive and not continuously connected to said engine;
an energy storage device;
a single motor/generator operatively connected to said energy storage device and not continuously connected to said engine or said transmission, said motor/generator configured to transmit power to and receive power from said energy storage device;
a controller operatively connected to said motor/generator and configured to control desired modes and output of said motor/generator
a first clutch operatively connected to said engine;
a second clutch operatively connected to said first clutch and said transmission, wherein said first and second clutches are operable for selectively interconnecting said engine and said transmission to transmit power therebetween; and
a third clutch operatively connected to said first and second clutches and said motor/generator, wherein said first and third clutches are operable for selectively interconnecting said engine and said motor/generator to transmit power therebetween, wherein said second and third clutches are operable for selectively interconnecting said transmission and said motor/generator to transmit power therebetween, wherein said first, second and third clutches are operable for selectively interconnecting said transmission, engine, and motor/generator to transmit power therebetween, and wherein said transmission does not receive power from said engine when said second clutch is not engaged.

* * * * *